United States Patent [19]

Cirrito

[11] Patent Number: 4,980,574
[45] Date of Patent: Dec. 25, 1990

[54] SOLAR IRRIGATION D.C. TO A.C. POWER SYSTEM SUPPLYING A.C. VOLTAGE AT A PRECISE POWER FREQUENCY

[75] Inventor: William J. Cirrito, Tucson, Ariz.

[73] Assignee: Photocomm, Inc., Scottsdale, Ariz.

[21] Appl. No.: 468,847

[22] Filed: Jan. 23, 1990

[51] Int. Cl.$^5$ .............................................. H02M 7/538
[52] U.S. Cl. ....................................... 307/21; 136/293; 307/46; 323/906; 363/134
[58] Field of Search ............... 363/134; 320/2 R; 322/2 R; 323/906; 136/293; 307/46, 48, 21, 23

[56] References Cited

U.S. PATENT DOCUMENTS

| | | | |
|---|---|---|---|
| Re. 25,242 | 9/1962 | Toulmin, Jr. ............................. | 136/4 |
| 3,056,077 | 9/1962 | McCarter ............................ | 363/134 |
| 3,376,165 | 4/1968 | Abbot ................................. | 136/89 |
| 3,379,394 | 4/1968 | Bialy .................................... | 244/1 |
| 4,319,310 | 3/1982 | Kingsley ............................ | 362/183 |
| 4,366,388 | 12/1982 | Wilkerson ............................ | 307/48 |
| 4,410,930 | 10/1983 | Yachabach ......................... | 315/175 |
| 4,644,256 | 2/1987 | Farias et al. ........................ | 323/906 |
| 4,725,740 | 2/1988 | Nakata ................................ | 307/46 |
| 4,920,474 | 4/1990 | Bruning et al. .................... | 363/134 |

FOREIGN PATENT DOCUMENTS 59775 3/1988 Japan .
182722 7/1988 Japan .

OTHER PUBLICATIONS

"Solar Power Conditioner", NASA Tech. Briefs, vol. 4, No. 1, p. 41 (Spring 1979).

Primary Examiner—William H. Beha, Jr.
Attorney, Agent, or Firm—Warren F. B. Lindsley

[57] ABSTRACT

A solar power system supplying A.C. voltages at 60 Hz as required for irrigation control with frequency precision and voltage levels in accordance with specifications for off-the-shelf irrigation timers and controls.

4 Claims, 2 Drawing Sheets

4,980,574

SOLAR IRRIGATION D.C. TO A.C. POWER SYSTEM SUPPLYING A.C. VOLTAGE AT A PRECISE POWER FREQUENCY

BACKGROUND OF THE INVENTION

In recent years the rapid expansion of the world's population coupled with the accelerated technological development of large sectors of the world has produced a dramatic increase in the demand for energy in all forms including fuels and electricity for heating, lighting, transportation and manufacturing processes. The construction of hydroelectric facilities and the development of fossil fuel resources has continued at a rapid rate, but it becomes increasingly evident for a number of reasons that these efforts are inadequate to keep pace with the demands of the growing population.

In the face of these growing demands and limited resources, there is one source of energy which is readily available to every country in the world in virtually unlimited quantities. This untapped source is solar energy. The World Book Encyclopedia (copyright 1963, U.S.) states that the amount of solar energy reaching the earth in one day equals the energy that could be produced by burning 550,000, 000,000 tons of coal, i.e., as much coal as would be dug in the United States in 1,000 years at the 1963 rate of mining. It further states that enough solar energy reaches the United States in 20 minutes to fill the country's entire power needs for one year.

The interest in this almost boundless resource and in its development and harnessing for use in homes and factories is rising as other resources dwindle. Its desireability is further enhanced by the fact that solar energy may be converted to practical use without the hazard of environmental contamination.

Apart from such important considerations as energy conservation and environmental concerns, solar power has other advantages to offer for special applications such as the control of remotely positioned irrigation systems, advertising sign displays and the like.

Irrigation systems are frequently installed in relatively remote locations where electric power at secondary voltages is not immediately available. Locations in this category include new housing development entries, highway medians, parks, golf courses, orchards and all types of landscaped areas. In such applications, solar power units permit fast and simple installations. There is no requirement for immediate utility line extensions with the attendant costs and inconvenience. The advantages continue after installation in the form of reduced operating costs. There are no utility bills to be paid. In addition, the absence of high voltages in the power unit significantly reduces safety hazards for service personnel or uninvited intruders. This is an especially important consideration in remote locations.

DESCRIPTION OF THE PRIOR ART

Numerous forms of solar power systems for different applications are disclosed in the prior art.

U.S. Pat. No. 3,379,394 discloses an optical solar energy converter utilizing one end of a cluster of optical fibers to collect solar energy and to conduct it to a common point for storage as thermal energy and subsequent conversion. Such systems, however, are expensive to construct and service and have not been accepted commercially.

U.S. Pat. No. 3,376,165 discloses apparatus for converting solar energy to electrical energy but is not embodied in a power unit for irrigation.

U.S. Pat. No. Re. 25,242 discloses apparatus employing a plurality of thermo-electric elements arranged to form a hollow cylinder and a lens system to concentrate heat rays of the sun into a beam within the cylinder.

U.S. Pat. No. 4,319,310 discloses a solar sign which utilizes solar energy for illumination of the display areas of the sign.

The provision of electrical energy for an irrigation system, however, involves certain specific requirements for the power system that are not encountered in other applications. Included in these requirements is the need for an A.C. voltage output at a precise frequency (60 hz. in the U.S.A.) so that standard off-the-shelf timers manufactured for irrigation systems will operate accurately. Specific A.C. voltages are also required for standard solenoid-controlled valves which are employed in irrigation systems.

None of the referenced prior art structures address the special requirements essential to an irrigation power system.

SUMMARY OF THE INVENTION

It is an object of this invention to provide a new and improved solar powered system for controlling remotely positioned objects requiring electrical energy.

Another object of the present invention is to provide a new and improved solar power system incorporating the specific requirements of a typical irrigation system.

A further object of the invention is to provide in such a system a capability for supplying A.C. voltage at a very precise power frequency such as 60 hz as required for normal and accurate operation of standard irrigation timers.

A further object of the invention is to provide in such a power system the availability of the special low voltage A.C. sources (such as 12 and 24 volts) that are required for operation of standard solenoid-controlled valves employed in irrigation systems.

A still further object of the invention is to provide in such a solar power system means for energy storage so that the system may be operable through periods when solar energy is not available.

A still further object of the invention is to provide such a system in a highly efficient form so that available energy may be effectively utilized and so that associated electrical parts will not be subjected to overheating which can reduce operating life and interfere with proper performance.

A still further object of the invention is to provide such a solar power system in an inexpensive form so that it will be readily accepted in the market place.

Yet another object of the invention is to provide in such a solar power system all the essential safeguards against personnel hazards so that it may be safety installed in remote and relatively unmonitored locations.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described with reference to the accompanying drawings, in which.

DESCRIPTION OF THE PREFERRED EMBODIMENT

Figure 1:
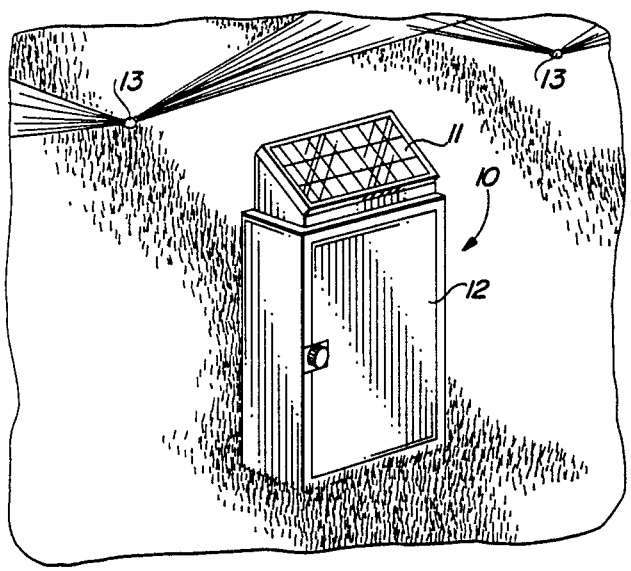
FIG. 1 is a perspective view of an embodiment of the solar powered irrigation system of the invention.

Referring more particularly to the drawings by characters of reference, FIG. 1 shows a solar-powered irrigation control unit 10 installed and operating in an irrigation system and embodying the invention. The control unit 10 receives solar energy incident upon its photovoltaic cell array 11 which is mounted atop an enclosure 12. Enclosure 12 houses the elements of an irrigation control system. The photovoltaic cells of array 11 convert solar energy into electrical energy. The electrical energy is then converted within unit 10 into A.C. voltages as needed to operate the standard timers and valves associated with the control of sprinklers or other water dispensers 13 of the irrigation system.

Figure 2:
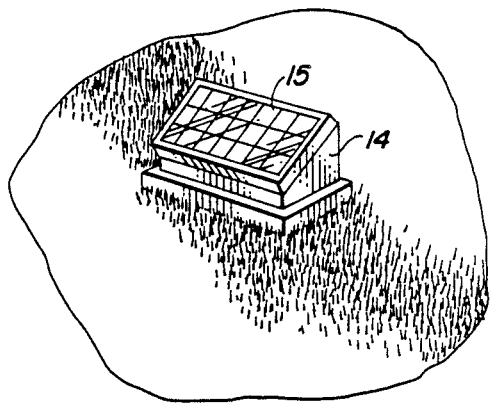
FIG. 2 is a perspective view showing an alternate form of the solar power unit of the invention.

The housing or enclosure 12 may be relatively large as shown in FIG. 1 for the more extensive irrigation systems or it may be quite small as shown in FIG. 2, where the size of the enclosure 14 suggests that its volume is hardly more than required to support the photovoltaic array 15. It will be noted that in both cases arrays 11 and 15 are disposed at an angle relative to the horizontal for optimum exposure to the rays of the sun. The orientation of unit 10 relative to the position of the sun must of course also be chosen for maximum exposure, i.e., it will generally be directed in a southerly direction.

Figure 3:
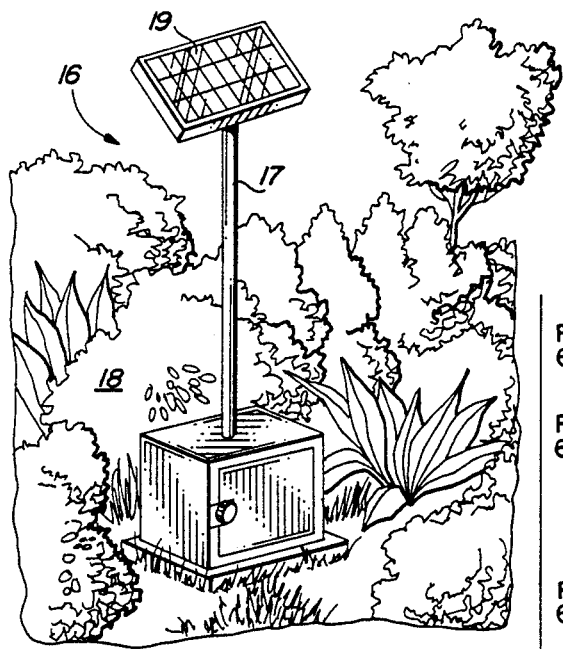
FIG. 3 is a perspective view showing another form of the solar power unit.

While the configuration shown in FIG. 2 is appropriate for use in open areas with low growing vegetation surrounding unit 10, an installation surrounded by tall shrubs or other plants will be better served by a solar power unit 16 of FIG. 3. Unit 16 utilizes an array that is supported atop a pole 17 that holds its array 19 of photovoltaic cells well above the surrounding vegetation 18. Pole 17 may also be rotatable or automatically rotated to track the position of the sun.

Figure 4:
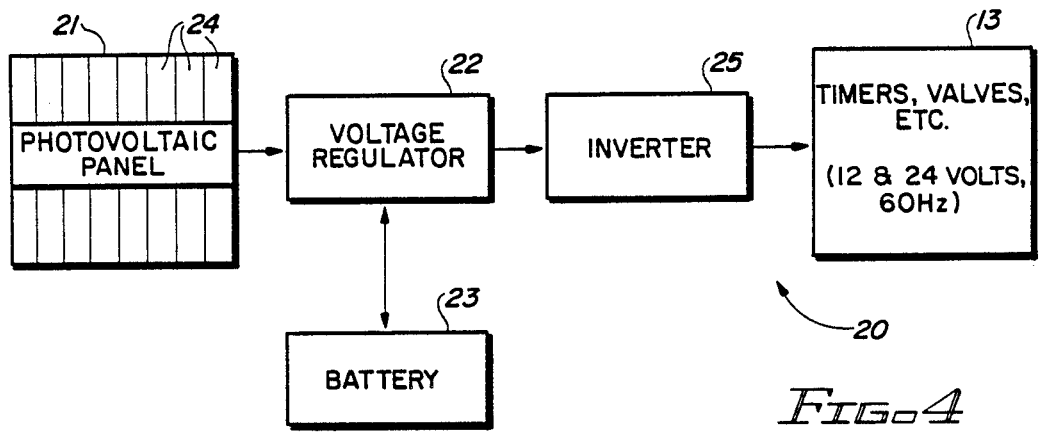
FIG. 4 is a functional block diagram illustrating the operation of the solar power unit.

Units 10, 14 and 16 are primarily energy conversion and storage systems as functionally illustrated in FIG. 4. The energy conversion and storage system 20 of FIG. 4 comprises a photovoltaic cell array 21, a voltage regulator 22, storage battery 23 and inverter 25.

Array 21 comprises a field of photovoltaic cells 24 each of which generates direct current electrical energy when excited by solar energy. In this mode of operation the photovoltaic cells act substantially as sources of current that is directed into the terminals of battery 23 by way of voltage regulator 22. Battery 23 which is basically a constant voltage device accepts current from array 21, the current acting as a charging current which stores energy in the battery while the constant-voltage characteristic of the battery sets the nominal value of the systems primary voltage. Typically one or more 12 volt batteries are employed with batteries connected in parallel.

Voltage regulator 22 controls the level of charging current directed to the battery, thereby preventing overcharging or over-heating. Regulator 22 also permits the flow of energy directly from array 21 to inverter 25 without intermediate storage in battery 23. Thus, during periods of exposure to solar energy the system is sustained directly and entirely by solar energy. At the same time, excess energy is being delivered to the battery or batteries 23 for storage. During other periods such as during cloudy weather or when the sun is too low in the sky to sustain the system, energy is drawn from the battery and passed on via regulator 22 to inverter 25.

Inverter 25 is tailored to meet the special requirements of an irrigation system. The typical irrigation system employs certain standard components which are available in the industry as standard, "off-the-shelf" items. One such component is a timer which controls the opening and closing of the electrically operated solenoid valves employed in the system to control the timing and duration of watering cycles. The precision of the timers is based on the constant-frequency characteristic of 60 cycle utility power. The accuracy of the timers can be no better than the accuracy of the frequency of the A.C. electrical power. Thus, if the standard irrigation timer is to be employed in the solar powered irrigation system, an A.C. voltage must be provided at a precise and stable frequency which, in the United States is 60 hz. A second requirement is that the A.C. voltages generated must be provided at the specific voltages for which the standard timers and "off-the-shelf" solenoid controlled valves are designed, i.e., 12 and 24 volts, A.C.

Figure 5:
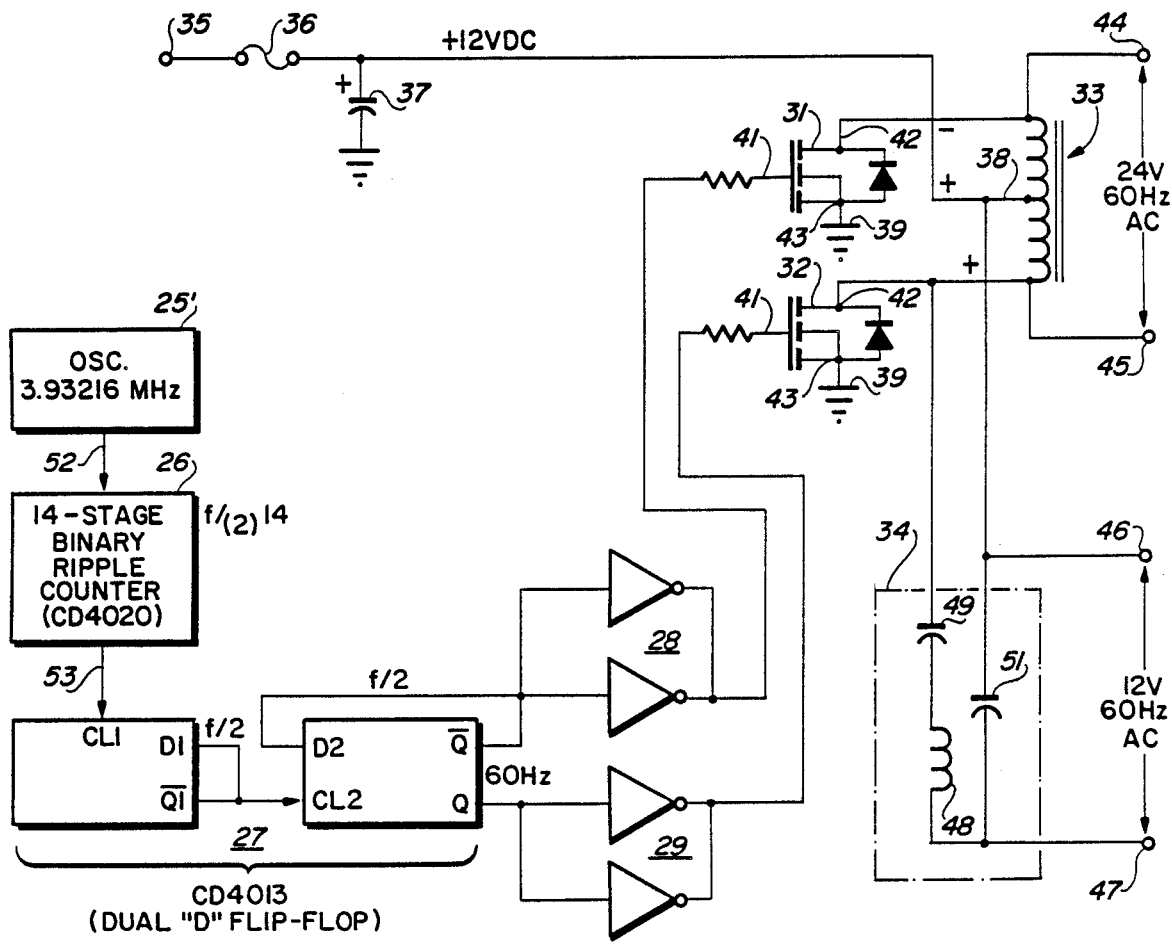
FIG. 5 is a simplified schematic of the D.C. to A.C. power converter in the power unit.

Inverter 25 of the invention, which is tailored to provide the functionality just described is shown schematically in FIG. 5.

As shown in FIG. 5, inverter 25 comprises a crystal-controlled oscillator 25', a 14-stage binary ripple counter 26, a dual "D" flip-flop 27, gate drivers 28 and 29, inverter switching elements 31 and 32, auto-transformer 33, and filter 34.

Twelve volts D.C. is supplied to inverter 25 from the photovoltaic array or from the battery via the voltage regulator at terminal 35, passing through a fuse 36. A filter capacitor 37 provides the necessary low A.C. impedance at the input of the inverter. The twelve volt input is connected to center-tap 38 of auto transformer 33.

Switching element 31 is connected to ground 39 from one end of auto-transformer 33 and switching element 32 is connected to ground 39 from the other end of auto-transformer 33. Ground 39 is connected via regulator 22 to the negative or ground terminals of panel 21 and battery 23. The switching elements 31 and 32 may be power mosfets, as shown, or they may be some other type of electronic switching device such as bipolar transistors. The power mosfets shown in FIG. 5 are rendered conductive by applying a positive D.C. voltage (approximately 12 volts) to the gate terminal 41. In the conductive state the mosfet presents a low resistance (a fraction of an ohm to a few ohms) between its power terminals, 42 and 43, one of which is known as a drain and the other as a source. When the gate signal is removed, the impedance between drain and source terminals reverts to a very high resistance on the order of a megohm.

For operation as an inverter, switching elements 31 and 32 are alternately turned on and off, with one being turned on as the other is turned off. Thus, while switching element 31 is turned on the upper end of transformer 33 is effectively connected to ground so that the twelve volts D.C. supplied to center-tap 38 is impressed across the upper half of transformer 33, thereby developing a voltage across the upper and lower halves of transformer 33 in the polarity shown by the unbracketed polarity signs, + and −, as shown in FIG. 5. When switching element 31 is turned off and switching element 32 is turned on, the polarity is reversed.

Figure 6:
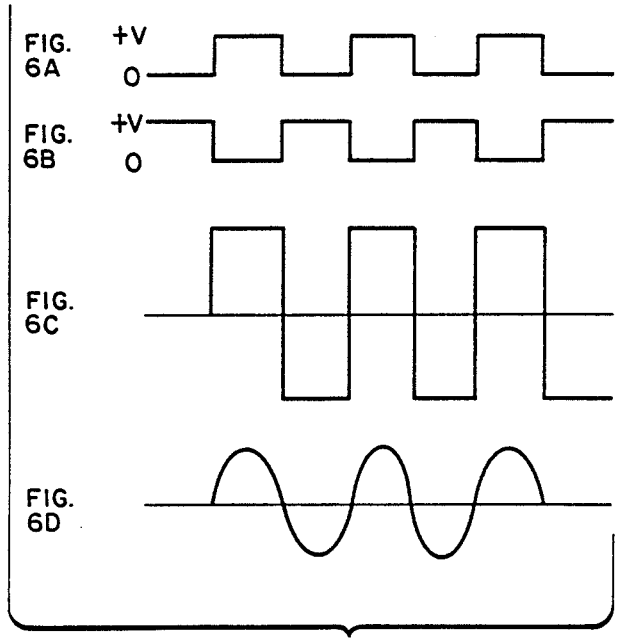
FIGS. 6A and 6D show operating wave forms of the power converter of FIG. 5.

FIGS. 6A and 6B show the gate signals that are supplied at gates 41 of elements 31 and 32, respectively, for alternately turning elements 31 and 32 on and off as just described. As shown in FIG. 6, the gate signal of FIG. 6A is at a positive voltage while the gate signal of FIG. 6B is at zero or ground potential, and the signal of FIG. 6B is positive while the signal at FIG. 6A is at ground. The A.C. voltage produced across transformer 33 by the alternate conduction of elements 31 and 32 is shown by FIG. 6C.

Two A.C. voltages are supplied by transformer 33 as indicated in FIG. 5. The first, 24 volts A.C., is delivered at output terminals 44 and 45 which are connected to the upper and lower ends, respectively, of auto-transformer 33. The second voltage, 12 volts A.C., is supplied by the lower half of transformer 33 and is delivered at terminals 46 and 47. Terminal 46 is connected directly to the center-tap 38 of auto-transformer 33 while terminal 47 is connected to the lower end of auto-transformer 33 through filter 34.

Filter 34 comprises an inductor 48 and two capacitors 49 and 51. Inductor 48 and capacitor 49 are serially connected between terminal 47 and the lower end of the transformer; capacitor 51 is connected directly across terminals 46 and 47. Filter 34 removes switching noise from the transformer voltage and removes higher harmonics from the 12 volt output to produce a voltage wave form at terminals 46 and 47 that approaches a sine wave as shown in FIG. 6D.

The wave forms of FIG. 6 are produced at a very precise frequency of 60 cycles per second (60 Hz). This precise frequency is obtained through the use of crystal-controlled oscillator 25'. Oscillator 25' supplies a 3.93216 MHz signal at its output terminal 52. Crystal oscillator operation is limited to very high frequencies (typically in the megahertz range) by the resonant characteristics of available crystals. Because the crystals exhibit very stable resonant frequencies over operating temperatures, the operating frequency is quite stable.

To obtain the control signals of FIGS. 6A and 6B at the desired frequency of 60 Hz, the 3.93216 MHz signal is reduced to 60 hz by means of counter 26 and dual "D" flip-flop 27. Counter 26 has fourteen serially-connected counter stages, each of which reduces frequency by a factor of two so that fourteen stages provide a frequency reduction of two to the fourteenth power (a factor of 16,384). The frequency at the output terminal 53 of counter 26 is thus 240 Hz (3,932,160/ 16,384 =240). The two stages of flip-flop 27 reduce the 240 Hz signal by another factor of four to the desired 60 hz. The complementary Q and $\overline{Q}$ outputs of the second flip-flop supply the 180 degree-out-of-phase signals required to drive the power mosfets as shown in FIGS. 6A and 6B. Buffers 28 and 29 serve as power amplifiers which supply sufficient gate drive energy for the control of switching elements 31 and 32.

In the first implementation of the invention, counter 25 was a CD4020, dual "D" flip-flop was a CD4013 and drivers 28 and 29 were CD-4049's (all made by RCA). By virtue of the stable and precise operating frequency of crystal oscillator 25', the 60 Hz frequency produced at the output of dual flip-flop 27 is accurate to I 0.005 Hz.

Although but one embodiment of the invention has been illustrated and described, it will be apparent to those skilled in the art that various changes and modifications may be made therein without departing from the spirit of the invention or from the scope of the appended claims.

What is claimed is:

1. A self contained solar power system employing incident solar energy for supplying A.C. voltage at a precise power frequency comprising:
   a plurality of photovoltaic solar cells,
   battery means for receiving and storing electrical energy generated by said solar cells,
   a voltage regulator connected to said solar cells for selectively connecting said electrical energy to said battery means and to an inverter,
   a D.C. to A.C. inverter for selectively converting the energy of said battery means and the energy directly from said solar cells into a predetermined constant frequency alternating energy source,
   said inverter comprising an oscillator means for converting the electrical energy from said battery means and said solar cells into said predetermined constant frequency alternating electrical energy source,
   said oscillator means comprises a crystal-controlled device, a binary counter comprising a 14 stage binary ripple counter, a two stage flip-flop, and a pair of gate drivers for energizing said pair of switching elements,
   said constant frequency electrical energy source from said oscillator means being applied to a pair of inverter switching elements,
   an auto-transformer for receiving said constant frequency electrical energy source from said switching elements,
   said switching elements alternately turning on and off with one being turned on as the other one is turned off, and
   said auto-transformer developing a predetermined voltage of said constant frequency of one polarity when energized by one of the switching elements and said predetermined voltage of said constant frequency of a reverse polarity when energized by the other of said switching elements.

2. The self contained solar powered system set forth in claim 1 wherein:
   said constant frequency electrical energy is sufficient to operate standard timers and valves associated with water dispensers.

3. The self contained solar powered system set forth in claim 1 wherein:
   said inverter converts said solar energy into a precise alternating current frequency for operating standard timer and valves used in irrigation systems.

4. A self contained solar power system employing incident solar energy for supplying A.C. voltage at a precise power frequency comprising:

an enclosure having a platform mounted thereon which is disposed at an angle relative to the horizontal, a plurality of photovoltaic solar cells mounted on said platform, battery means for receiving and storing electrical energy generated by said solar cells, a voltage regulator connected to said solar cells for selectively connecting said electrical energy to said battery means and to an inverter, a D.C. to A.C. inverter for selectively converting the energy of said battery means and the energy directly from said solar cells into a predetermined constant frequency alternating electrical energy source, said inverter comprising a crystal-controlled oscillator means for converting the electrical energy from said battery means and said solar cells into said predetermined constant frequency alternating electrical energy source, said crystal-controlled oscillator means comprising a binary counter having a 14 stage binary ripple counter, a two stage flip-flop, and a pair of gate drivers for energizing said pair of switching elements, said constant frequency electrical energy source from said oscillator means being applied to a pair of inverter switching elements, an auto-transformer for receiving said constant frequency electrical energy source from said switching elements, said switching elements alternately turning on and off with one being turned on as the other one is turned off, and said auto-transformer developing a predetermined voltage of said constant frequency of one polarity when energized by one of the switching elements and said predetermined voltage of said constant frequency of a reverse polarity when energized by the other of said switching elements.

* * * * *